(12) United States Patent
Rottenberger et al.

(10) Patent No.: US 6,648,310 B2
(45) Date of Patent: Nov. 18, 2003

(54) SHOCK ABSORBER

(75) Inventors: Theo Rottenberger, Burkardroth-Gefäll (DE); Markus Reinhart, Schweinfurt (DE)

(73) Assignee: Sachs Race Engineering GmbH, Schweinfurt (DE)

( * ) Notice: Subject to any disclaimer, the term of this patent is extended or adjusted under 35 U.S.C. 154(b) by 0 days.

(21) Appl. No.: 09/867,808

(22) Filed: May 30, 2001

(65) Prior Publication Data

US 2002/0003072 A1 Jan. 10, 2002

(30) Foreign Application Priority Data

May 30, 2000 (DE) .......................... 100 26 821
Aug. 26, 2000 (DE) .......................... 100 42 090

(51) Int. Cl.[7] ................. F16F 9/18; F16F 9/50
(52) U.S. Cl. .............. 267/64.26; 188/315; 188/286; 188/269; 267/64.15
(58) Field of Search .............. 267/64.26, 64.15, 267/64.25; 188/281, 314, 315, 322.19, 286, 297, 317, 318, 269, 282.1–282.6; 244/104 FP; 92/171.1, 134; 16/57, 51, 66; 293/134; 213/43, 45, 46, 223

(56) References Cited

U.S. PATENT DOCUMENTS

| | | | |
|---|---|---|---|
| 2,570,362 A | * 10/1951 | Mercier | .................... 267/64.26 |
| 2,624,592 A | 1/1953 | MacPherson | |
| 2,721,074 A | 10/1955 | Bourcier de Carbon | |
| 3,083,000 A | 3/1963 | Perdue | |
| 3,128,088 A | * 4/1964 | Paschakarnis | |
| 3,552,766 A | 1/1971 | Willich | |
| 3,588,075 A | 6/1971 | Peddinghaus | |
| 3,853,311 A | * 12/1974 | Kreuzer et al. | |
| 3,904,182 A | * 9/1975 | Allinquant et al. | |
| 3,944,198 A | * 3/1976 | Sakamoto | |
| 3,970,292 A | * 7/1976 | Dachicourt et al. | |
| 4,284,178 A | 8/1981 | Tomita et al. | |
| 4,405,119 A | * 9/1983 | Masclet et al. | .......... 267/64.26 |
| 4,935,985 A | * 6/1990 | Wang | |
| 5,145,206 A | * 9/1992 | Williams | |
| 5,242,157 A | * 9/1993 | Bonenberger et al. | |

FOREIGN PATENT DOCUMENTS

| | | |
|---|---|---|
| AT | 41 817 | 1/1987 |
| DE | 855 644 | 1/1953 |
| DE | 1 756 158 | 11/1957 |
| DE | 1 041 742 | 10/1958 |
| DE | 1 625 418 | 1/1970 |
| DE | 1 750 774 | 3/1971 |
| DE | 1 655 973 | 7/1971 |
| DE | 29 32 553 | 2/1980 |
| DE | 35 43 156 | 6/1987 |
| DE | 39 34 386 | 4/1991 |
| DE | 42 12 696 | 10/1993 |
| FR | 821 516 | 12/1937 |
| WO | WO 9216770 | 10/1992 |

* cited by examiner

Primary Examiner—Douglas C. Butler
(74) Attorney, Agent, or Firm—Cohen, Pontani, Lieberman & Pavane

(57) ABSTRACT

Shock absorber, having a cylinder in which a piston rod is arranged as a displacer and which has a piston which subdivides a working space filled with damping medium into two working chambers. Arranged concentrically with this cylinder is an outer tube which, together with the cylinder, forms an annular space sealed off from the atmosphere by seals. The outer tube, together with the piston rod, executes a synchronous movement relative to the cylinder as a function of the reciprocating movement. At least one of the seals of the annular space is arranged in a fixed location with respect to the cylinder, and at least another one of the seals is arranged in a fixed location with respect to the outer tube, so that the annular space has a volume which varies as a function of the reciprocating position of the shock absorber. The annular space is connected via at least one flow connection to at least one of the working chambers.

20 Claims, 3 Drawing Sheets

SHOCK ABSORBER

BACKGROUND OF THE INVENTION

FIELD OF THE INVENTION

The invention relates to a shock absorber.

In vehicles which, when being driven, are subjected to relatively high loading of the chassis, for example rally vehicles, shock absorbers on the single-tube damper principle are often used, it being possible for the piston rod to be attached to the wheel. A cylinder belonging to the shock absorber is covered by an outer tube which in turn is connected to the piston rod. In an annular space between the outer tube and the cylinder, annular bearings are arranged for guidance. In addition, the annular space is filled with a lubricant. One exemplary embodiment is illustrated in "Fahrwerktechnik", Jörnsen Reimpell, Volume 3, p. 60, 1974 edition.

One general problem is that the grease in the annular space not only becomes thin at high temperatures but exerts an operating pressure on the annular bearings which can lead to leaks in the area of the annular bearings.

It is of course also possible to provide a partial filling for the annular space, but then the disadvantage arises that the air trapped in the annular space exerts a considerable insulating action on the cylinder and therefore restricts the maximum permissible development of heat, which is in turn dependent on the damping performance provided by the shock absorber.

SUMMARY OF THE INVENTION

It is an object of the present invention to provide a shock absorber which, firstly, has good guidance between the piston rod and the cylinder and, secondly, exhibits good heat dissipation.

According to the invention, the object is achieved by at least one of the seals of the annular space being arranged in a fixed location with respect to the cylinder and at least one of the seals being arranged in a fixed location with respect to the outer tube, so that the annular space has a volume which varies as a function of the reciprocating position of the shock absorber. The annular space is connected via at least one flow connection to at least one working chamber.

The advantage of the invention is that the volume of the annular space is in continuous interchange with the damping medium in the working chambers and is pumped around with the reciprocating movement. The possibility that insulating gas cushions will be formed is avoided. The interchange of the damping medium also tends to minimize the negative effect of a gas cushion between the cylinder and the outer tube.

Furthermore, a noticeable overlap between the outer tube and the cylinder can be maintained, which results in good guidance of the piston rod. It is therefore possible for transverse forces on the shock absorber to be absorbed by the outer tube.

In a further advantageous embodiment of the invention, provision is made for a volume displaced by the displacer in the working space to substantially correspond to the stroke-dependent volume of the annular space. If the cross section of the annular space is made equal to the cross section of the piston rod, and if the piston has at least one fluid connection, it is then ensured that the annular space is able to accommodate the volume displaced from the working chambers by the piston rod. The annular space therefore constitutes a compensation space with a variable volume.

If, for example, the overall space for the shock absorber does not permit a configuration of the annular space for the complete accommodation of the volume displaced by the piston rod, provision can be made for the shock absorber to have a compensation space.

Alternatively, provision is made for the volume of the compensation space to be designed to substantially match the thermal expansion of the damping medium. In the case of a shock absorber designed on the principle of a single-tube damper, a dividing piston is generally used. Consequently, the dividing piston has to execute only one stroke, which is carried out only as a result of the expansion of the damping medium which results from the thermal expansion in the shock absorber. The dividing piston is only very slightly dynamically loaded.

According to an advantageous embodiment, the compensation space has a pressurized gas filling. Alternatively, a mechanical spring can also be employed.

Furthermore, in each case a pressurized area of the outer tube, which acts in the axial direction of the shock absorber, and that of the displacer are substantially equal. This means that a shock absorber of single-tube damper design does not exert any load bearing force which acts on a vehicle. Precisely in the case of high-performance vehicles, which is used in the area of motor sport, the effect occurs that the development of heat causes the operating pressure in the shock absorber to rise considerably. Conventional single-tube shock absorbers have a load bearing force which is calculated from the cross-sectional area of the piston rod and the operating pressure. If the pressure rises because of the development of heat in the shock absorber, then the load bearing force increases to the same extent. This relationship leads to the vehicle superstructure being lifted, since the load bearing force of the single-tube damper and the spring force of the vehicle load bearing spring are oriented in the same direction. With the inventive configuration, the vehicle level remains constant.

It is also possible to provide for the pressurized area in the annular space to be greater than that of the displacer. This then provides a force which would compress the shock absorber and lower the vehicle superstructure. The design therefore depends on the vehicle and the intended use of the vehicle.

A valve device arranged outside the cylinder is connected via a duct starting from a first working chamber above the piston rod. An outlet from the valve device is connected to the second working chamber.

If the damping force is intended to be adjustable from both reciprocating directions of the displacer, then both working chambers are respectively connected to the valve device, the piston rod having separate ducts for the working chambers.

An advantageous development of the invention provides for an end stop to limit the reciprocating movement of the shock absorber. To this end, the end stop has a stop spring which is oriented counter to the further reciprocating movement. The stop spring opposes a mechanical force to the reciprocating movement.

According to a further advantageous embodiment, the stop spring is supported on a transfer ring which is driven by a component on the piston-rod side.

Furthermore, provision is made for the transfer ring to have at least one throttling cross section through which damping medium flows.

The throttling cross section in the transfer ring is formed by a central passage opening. As a result, the damping medium can be displaced, at least partially, from the reducing working space through a duct within the piston rod.

In order to switch off the end stop during the reverse reciprocating movement of the piston rod, provision is made for the at least one throttling cross section to be operatively connected to a nonreturn valve which opens in the direction of the force of the stop spring.

The nonreturn valve has a sealing disk which can move axially within a groove and controls at least one bypass to the at least one throttling cross section.

It is also possible to configure the end stop in such a way that the sealing disk contains the at least one throttling cross section.

The action of the end stop can be varied as a function of stroke in that during a reciprocating movement of the piston rod, a plunger dips into the throttling cross section and reduces the throttling cross section.

In addition, the plunger can be displaced in terms of its position in relation to the at least one throttling cross section, so that, based on a defined reciprocating position of the piston rod, the result is an adjustable effect of the end stop.

An end stop which acts in the opposed reciprocating direction of the piston rod is designed so that the outlet opening within the piston rod for the second working space is closed as a function of stroke by a cover on the cylinder side. In this case, the cover on the cylinder side is formed by the piston-rod guide.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
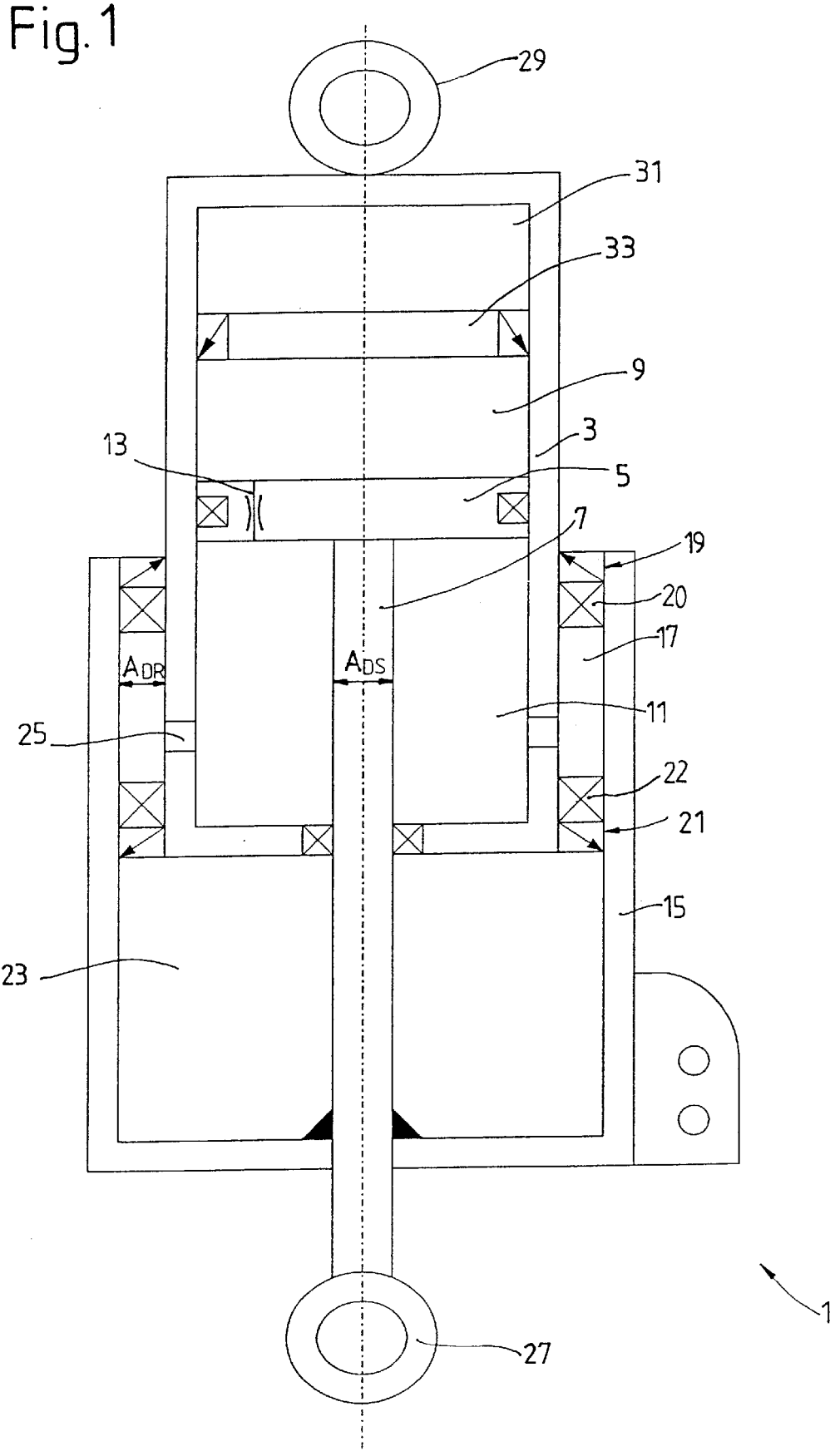
FIG. 1 shows a basic illustration of a shock absorber according to the invention.

FIG. 1 shows a shock absorber 1 which has a cylinder 3 which constitutes a working space filled with damping medium. The working space is subdivided by a piston 5 on a piston rod 7 into a first working chamber 9 and a second working chamber 11. Formed in the piston 5 is at least one fluid connection 13, which connects the two 7 working spaces to each other and produces a damping action, the piston rod 7 forming a displacer.

An outer tube 15 is mounted coaxially with the cylinder 3 so as to slide on the cylinder 3. The outer tube 15 is fixed to the piston rod 7 and, together with the piston rod 7, can execute a synchronous movement relative to the cylinder 3. The cylinder 3 and the outer tube 15 form an annular space 17, which is closed at the end by seals 19; 21. The seal 19 is connected in a fixed location to the outer tube 15, and the seal 21 is connected in a fixed location to the cylinder 3, so that, given a constant cross section, the annular space 17 has a volume which varies as a function of the reciprocating position of the piston rod. 7 The seals 19 and 21 can in each case be assigned bearings 20, 22, the bearing 20 being fixed to the outer tube 15 in a fixed location, and the bearing 22 being fixed to the cylinder 3 in a fixed location. The bearings 20 and 22 are lubricated by the damping medium in the annular space 17. The working chambers 9; 11 and the annular space 17 are completely filled with damping medium, the working chamber 11 being sealed off from the atmosphere, but, by contrast, an annular chamber 23 between the piston rod 7 and the outer tube 15 being connected to the atmosphere via an opening (not shown). The annular space 17 has a flow connection 25 to the working chamber 11.

If the piston rod 7 moves into the cylinder 3 because of a relative movement between connecting elements 27; 29, then the volume of the inwardly moving piston rod 7 is displaced. Because of the fluid connection 13 in the piston 5, the piston 5 in this embodiment does not act as a displacer. As the piston rod 7 moves in, the distance between the two seals 19; 21 increases since the seals, as already described above, are fixed to the cylinder 3 and the outer tube 15, respectively. If it is assumed that the cross-sectional area of the annular space 17 corresponds to the cross-sectional area of the piston rod 7, the annular space 17 is able to accommodate the volume displaced by the piston rod 7 via the flow connection. The volume displaced by the piston rod 7 is therefore always pumped around between the annular space 17 and the working chambers 9; 11. The annular space 17 acts like a compensation space in a conventional single-tube shock absorber. The outer tube 15 can at least partially dissipate the heat of the damping medium in the working chambers.

In order to be able to compensate for the thermal expansion of the damping medium in the cylinder 3, a compensation space 31 is formed in the cylinder 3, and is separated from the working chamber 9 by a dividing piston 33. The compensation space 31 is filled with a pressurized gas. Because of the axially pressurized area $A_{DR}$ in the annular space 17 and the pressurized cross-sectional area $A_{DS}$ of the piston rod 7, which are dimensioned to be equal, the compressive force of the compensation space 31 is compensated for. The shock absorber does not exert any load bearing force on a vehicle superstructure.

However, it is also possible to provide for the annular space 17 to have a larger cross-sectional area than the cross-sectional area of the piston rod 7. Then, although the dividing piston 33 likewise has to execute a reciprocating movement during each reciprocating movement of the piston rod 7, it is then possible to generate a resulting force which compresses the shock absorber and therefore acts counter to the load bearing force of a vehicle load bearing spring. It is therefore possible to achieve the situation where a vehicle which, for example, on the one hand becomes lighter as a result of a decreasing tank content and in which, on the other hand, the shock absorbers warm up during driving operation, said vehicle maintains an approximately constant ride height. Of course, it is also further possible to design the dimensions of the piston rod 7 in relation to the annular space 17 in such a way that the shock absorber exerts a load bearing force additional to the load bearing force of the vehicle spring.

Because the outer tube 15 is mounted on the cylinder 3, transverse forces which act on the piston rod 7 can be transmitted to the cylinder 3 via the outer tube 15. This results in a movement with lower friction between the piston rod 7 and the cylinder 3.

Figure 2:
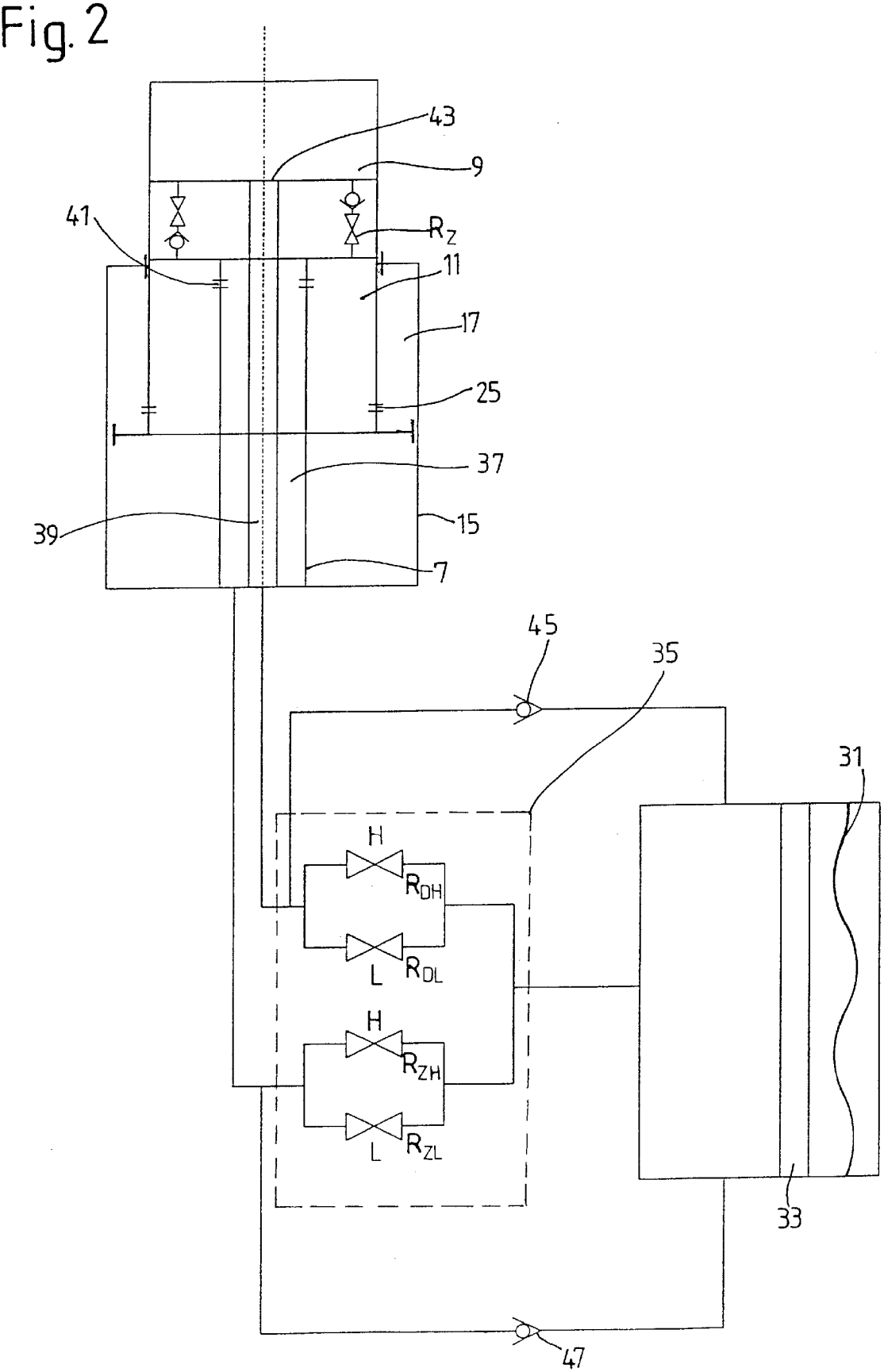
FIG. 2 shows a design of the shock absorber of FIG. 1 with an adjustable valve device.

FIG. 2 is intended to illustrate a combination of a shock absorber according to FIG. 1 with a valve device 35. The constructional design of the shock absorber 1 corresponds to the embodiment according to FIG. 1 with regard to the outer tube 15, the annular space 17 and the cylinder 3. Differing from that embodiment, a valve device 35 arranged outside the cylinder 3 is used, and is connected via ducts 37; 39 in the hollow piston rod 7 to the working chambers 9; 11. To this end, corresponding connecting openings 41; 43 for the respective ducts are formed in the piston rod 7. The valve device 35 can be adjusted separately for different flow rates and flow directions. Nonreturn valves 45; 47 prevent a hydraulic short circuit.

Figure 3:
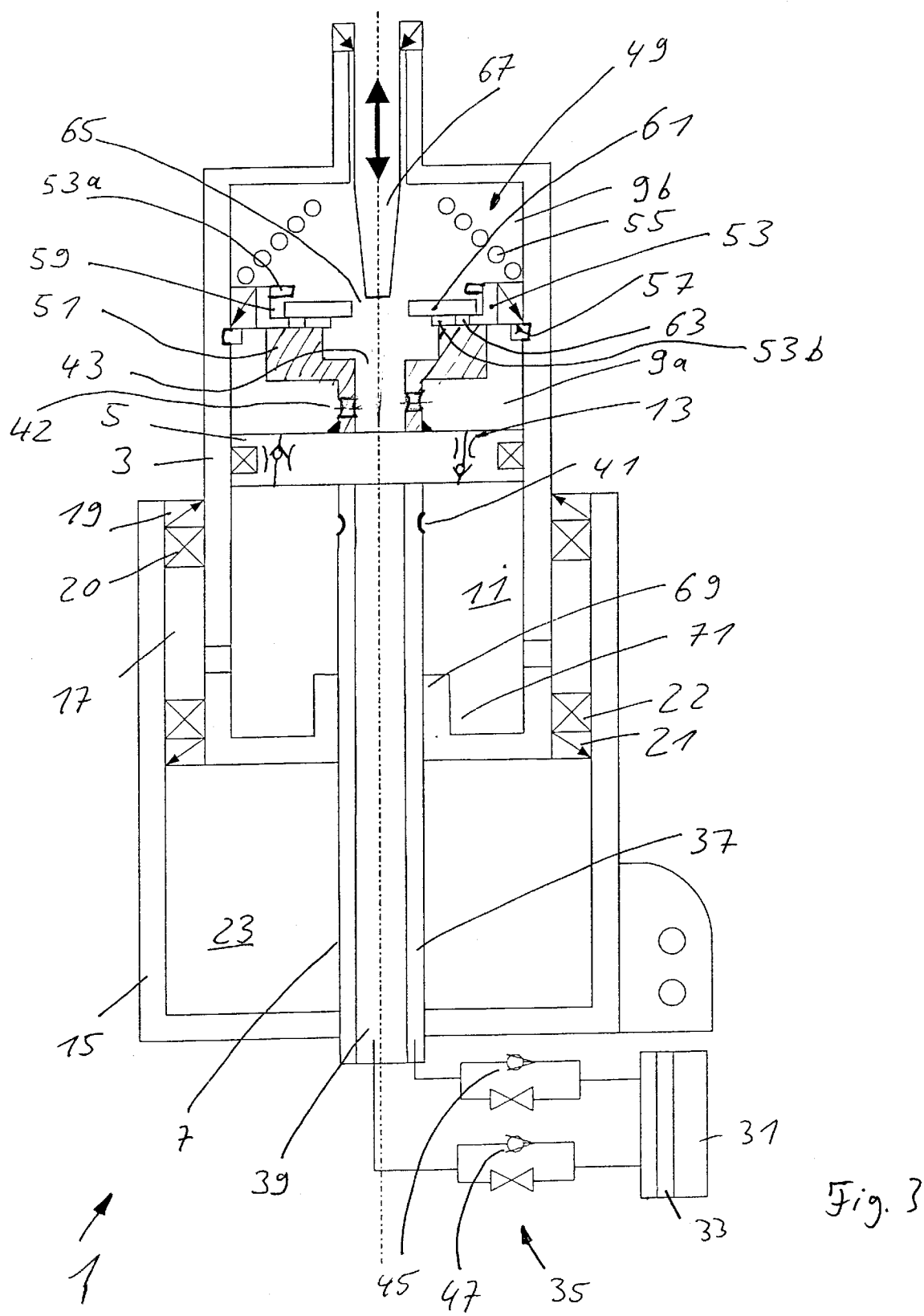
FIG. 3 shows a design of the shock absorber of FIG. 2 with at least one end stop.

FIG. 3 constitutes a modification of FIG. 2, so that only the functional and constructional differences will be discussed. The fact that, in FIG. 3, the valve device 35 has only one damping valve per flow direction is unimportant, there could also be two or three damping valves for different flow rates within the ducts 37; 39 of the hollow piston rod 7.

As an additional device, the shock absorber according to FIG. 3 is given an end stop 49, which acts in the push-in direction of the piston rod 7 into the cylinder 3 or, considered in another way, when the cylinder 3 moves into the outer tube 15.

The piston rod 7 has a stepped extension 51, which also has the connecting opening 43. Depending on the reciprocating position of the piston rod 7, the end face of the extension 51 encounters a transfer ring 53 which, in its initial position, is biased by a stop spring 55 against a supporting face 57, for example a securing ring. The transfer ring 53 is sealed off with respect to the inner wall of the cylinder 3, but has a central passage opening. In addition, within a groove 59, the transfer ring 53 bears a sealing disk 61, which controls at least one bypass 63 as a function of its axial position. The sealing disk 61, in combination with the at least one bypass 63 and the transfer ring 53, forms a nonreturn valve, which closes in the push-in direction of the piston rod 7 and opens in the direction of the force of the stop spring 55. In FIG. 3, the bypasses are closed. The sealing disk 61 contains a throttling cross section 65 in the flow connection to the connecting opening 43. However, the throttling cross section 65 can also be formed by the transfer ring 53, if one of the groove side walls 53a; 53b bounds a small central passage opening as the sealing disk 61.

A plunger 67 which can be adjusted axially relative to the cylinder 3 and which has a conical end region dips into the throttling cross section 65 as a function of the reciprocating position of the transfer ring 53 or the piston rod 7, so that the effective throttling cross section 65 is reduced because of the conical end region.

During an inward movement of the piston rod 7, the end face of the stepped extension 51 comes into contact with the transfer ring 53. Starting from this reciprocating position of the piston rod 7, the working chamber 9 is subdivided into a part-space 9a of constant size between the piston 5 and the transfer ring 53 and a part-space 9b between the transfer ring 53 and the end crown of the cylinder 3, said space becoming increasingly small during a further piston-rod inward movement. Within the part-space 9b, the operating pressure continues to rise. In the part-space 9a, no exchange of damping medium takes place, since the part-spacer 9a firstly remains constant in terms of its volume, and the piston 5 and the transfer ring 53 each have a seal, so that the damping medium displaced in the part-space 9b can flow away only via the throttling cross section 65 into the connecting opening 43 in the hollow piston rod 7. Because of the pressure relationship between the two part-spaces 9a; 9b, the sealing disk 61 closes all the bypasses 63 within the groove side wall 53b. During further inward movement, as already described, the plunger 67 reduces the effective throttling cross section.

There is also the possibility that the part-space 9a is connected via further connecting openings 42 in the piston rod 7 to the duct 39, so that during an inward movement of the piston rod 7, part of the damping medium displaced from the part-space 9b flows into the duct 39, but can flow into the working chamber 11 through the connecting openings 42 and the flow connection 13 in the piston 5. The volume distribution of the damping medium which flows away from the duct, through the connecting openings 42 and into the working chamber 11, is given by the throttling resistances of the connecting openings 42 and the flow connections 13 in the piston 5 in relation to the throttling resistances of the valve device 35.

If the piston rod 7 moves out again, the stop spring 55 forces the transfer ring 53 in the direction of the supporting face 57. During this restoring movement, the sealing disk 61 lifts off the at least one bypass 63. The piston-rod movement generally takes place faster than the restoring movement of the transfer ring 53, so that damping medium is able to flow into the part-space 9b from the part-space 9a through the opened bypasses 63.

Overall, the stop spring 55 and the transfer ring 53 form a mechanical end stop which depends hydraulically on the travel.

In addition, the shock absorber can have a further end stop, which acts during an outward movement of the piston rod 7 from the cylinder. Beginning at a specific reciprocating position of the piston rod 7, the connecting opening 41 in the piston rod for the channel 37 overlaps a cover 69 of a piston-rod guide 71, so that the effective cross section of the connecting opening is reduced in size, and noticeable throttling of the outward flow in the direction of the compensation space 31 is established.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A shock absorber, comprising: a cylinder defining a working space filled with damping medium; a piston rod arranged in the cylinder as a displacer and having a piston which subdivides the working space filled with damping medium into first and second working chambers, said piston rod having a cross-sectional area $A_{DS}$; an outer tube arranged concentrically with the cylinder so as to form together with the cylinder an annular space outside said cylinder, said annular space having a cross-sectional area $A_{DR}$, wherein the cross-sectional area $A_{DR}$ is substantially equal to the cross-sectional area $A_{DS}$; and seals arranged so as to seal off the annular space from the atmosphere, wherein the outer tube together with the piston rod execute a synchronous movement relative to the cylinder as a function of reciprocating movement of the shock absorber, at least one of the seals of the annular space being arranged in a fixed location with respect to the cylinder, and at least another one of the seals being arranged in a fixed location with respect to the outer tube, so that the annular space has a volume which varies as a function of reciprocating position of the shock absorber, the cylinder having at least one flow connection so as to connect the annular space to at least one of the working chambers, said outer tube and said piston rod forming an annular chamber which is isolated from said annular space, said annular chamber being connected to atmosphere.

2. A shock absorber as defined in claim 1, wherein a volume displaced by the displacer in the working space substantially corresponds to a stroke-dependent volume of the annular space.

3. A shock absorber as defined in claim 1, wherein the cylinder further defines a compensation space.

4. A shock absorber as defined in claim 3, wherein the compensation space has a volume that substantially matches thermal expansion of the damping medium.

5. A shock absorber is defined in claim 3, wherein the compensation space is filled with a pressurized gas.

6. A shock absorber as in claim 3 further comprising a dividing piston separating said first working chamber from said compensation space, said second working chamber surrounding said piston rod.

7. A shock absorber as defined in claim 1, and further comprising a valve device arranged outside the cylinder and connected via a duct to the first working chamber above the piston rod, the valve device having an outlet opening connected to the second working chamber.

8. A shock absorber as defined in claim 7, wherein both working chambers are respectively connected to the valve device, the piston rod having separate ducts for the working chambers.

9. A shock absorber as defined in claim 7, and further comprising a cover arranged on the cylinder so as to close the outlet opening within the piston rod for the second working space as a function of stroke.

10. A shock absorber as defined in claim 9, wherein the cover on the cylinder is formed as a piston-rod guide.

11. A shock absorber as defined in claim 1, and further comprising an end stop arranged so as to limit the reciprocating movement of the shock absorber.

12. A shock absorber as defined in claim 1, wherein the end stop has a stop spring which is oriented to the reciprocating movement.

13. A shock absorber as defined in claim 12, and further comprising a transfer ring driven by a component on a piston-rod side, the stop spring being supported on the transfer ring.

14. A shock absorber as defined in claim 13, wherein the transfer ring has at least one throttling cross section through which damping medium flows.

15. A shock absorber as defined in claim 14, wherein the throttling cross section in the transfer ring is formed by a central passage opening.

16. A shock absorber as defined in claim 14, and further comprising a nonreturn valve which opens in a direction of force of the stop spring, the at least one throttling cross section being operatively connected to the nonreturn valve.

17. A shock absorber as defined in claim 16, wherein the nonreturn valve has a sealing disk which is axially movable within a groove in the transfer ring and controls at least one bypass to the at least one throttling cross section.

18. A shock absorber as defined in claim 16, wherein the sealing disk contains the at least one throttling cross section.

19. A shock absorber as defined in claim 16, and further comprising a plunger operatively arranged to dip into the throttling cross section during a reciprocating movement of the piston rod and reduce the throttling cross section.

20. A shock absorber as defined in claim 19, wherein the plunger is displaceable in terms of position in relation to the at least one throttling cross section.

* * * * *